United States Patent
Delavaux

[19]
[11] Patent Number: 5,878,071
[45] Date of Patent: Mar. 2, 1999

[54] FABRY-PEROT PULSED LASER HAVING A CIRCULATOR-BASED LOOP REFLECTOR

[75] Inventor: Jean-Marc Pierre Delavaux, Wescosville, Pa.

[73] Assignee: Lucent Technologies Inc., Murray Hill, N.J.

[21] Appl. No.: 827,321

[22] Filed: Mar. 26, 1997

[51] Int. Cl.⁶ ................................................ H01S 3/083
[52] U.S. Cl. .................................. 372/94; 372/10; 372/18
[58] Field of Search ................................ 372/10, 11, 12, 372/13, 18, 94, 703

[56] References Cited

U.S. PATENT DOCUMENTS

| | | | |
|---|---|---|---|
| 5,295,209 | 3/1994 | Huber | 372/26 |
| 5,381,426 | 1/1995 | Fontana et al. | 372/18 |
| 5,450,427 | 9/1995 | Fermann et al. | 372/18 |
| 5,596,667 | 1/1997 | Watanabe | 372/21 |
| 5,778,015 | 7/1998 | Gunning et al. | 372/26 |

OTHER PUBLICATIONS

Duling, I.N. et al., "Single–Polarisation Fibre . . . ", *Electronics Letters*, vol. 28, No. 12, pp. 1126–1128 (Jun. 4, 1992).
Carruthers, T.F. et al., "10–GHz, 1.3–ps erbium . . . ", *Optics Letters*, vol. 21, No. 23, pp. 1927–1929 (Dec. 1, 1996).
Lin, H. et al., "Harmonically mode–locked . . . ", *OFC Technical Digest*, WL5, pp. 167–168 (1997), No Month.

*Primary Examiner*—Rodney Bovernick
*Assistant Examiner*—Robert E. Wise

[57] ABSTRACT

In a pulsed Fabry-Perot laser, such as a Q-switched laser or a mode-locked laser, one of the resonator reflectors comprises a waveguide loop coupled to the gain medium via a circulator. In one embodiment, only a modulator is located in the loop. In another embodiment, the circulator is switchable and the loop may contain either an unidirectional device, such as an isolator, or may contain only the waveguide itself, depending on which states of the circulator are utilized in the switching process. Also described are several arrangements for multiplexing lasers of different operating wavelengths.

9 Claims, 3 Drawing Sheets

FABRY-PEROT PULSED LASER HAVING A CIRCULATOR-BASED LOOP REFLECTOR

FIELD OF THE INVENTION

This invention relates generally to pulsed lasers and, more particularly, to Q-switched lasers and mode-locked lasers.

BACKGROUND OF THE INVENTION

Pulsed lasers are used in wide variety of applications ranging from signal sources in telecommunications systems to optical sources in sensing and measuring equipment. Q-switched lasers, for example, provide high power, short duration pulses for optical sensing functions, optical time domain reflectometry, and the measurement of nonlinearities in optical fibers. Illustratively, Q-switched lasers are capable of generating peak pulse powers of the order of a few hundred watts or more at repetition rates in the tens of kilohertz range. Pulse durations of a about 1–100 nanoseconds are typical. Mode-locked lasers, on the other hand, may serve as high speed (e.g., multi-gigabit) signal sources in telecommunication systems, particularly soliton transmission systems. As such, the mode-locked laser may generate peak pulse powers of a few hundred milliwatts at repetition rates in excess of 10 GHz. Pulse durations of a few picoseconds are typical.

Q-switched and mode-locked lasers have been extensively reported in the scientific literature. Two basic structures have been successfully demonstrated: a fiber laser ring topology of the type described by F.Fontana et al. in U.S. Pat. No. 5,381,426 issued on Jan. 10, 1995 and a Fabry-Perot (FP) fiber laser configuration of the type shown in U.S. Pat. No. 5,450,427 granted to M. E. Fermann et al. on Sep. 12, 1995. Both of these structures suffer from a similar malady, that is, relatively high insertion losses and hence relatively high lasing thresholds.

More specifically, in the ring topology, the single pass gain through the active medium has to exceed the optical insertion loss of the other intracavity components (i.e., the modulator, filter, isolator, etc.) in order to produce lasing. Similarly, in the case of the FP configuration the double pass gain of the active medium has to offset the double pass insertion loss produced by the same type of intracavity components.

One approach to alleviating this problem is to arrange for the laser radiation to make a double pass through its active medium for every single pass through the other intracavity components, thereby reducing the insertion loss introduced by those components. Such a design produces better performance in terms of lower lasing threshold and higher pump conversion efficiency. These indicia translate into higher power, shorter duration, and more stable pulses in both Q-switched and mode-locked lasers. See, for example, the mode-locked Er-fiber laser described by T. F. Carruthers et al. in *Optic Letters,* Vol. 21, No. 23, pp. 1927–1929, Dec. 1, 1996. In the Carruthers laser one mirror of the FP design is formed by a conventional Faraday rotator, but the other mirror comprises a polarization-maintaining (PM) fiber loop which is coupled to the active medium by a polarization splitter-combiner (PSC). A polarization dependent modulator is located in the loop along with a polarization-rotating splice, an isolator, and an output coupler. However, this design suffers from several disadvantages. First, in order that light in the Carruthers loop be coupled back through the PSC to the gain medium, the polarization must be rotated by 90°; hence the loop includes a polarization-rotating splice. Second, the loop contains an isolator to provide isolation to the input side of the modulator. (To enhance performance the design might in practice very well include a second isolator on the output side of the modulator.) Third, the behavior of the modulator and the pulse quality (i.e., the shape and/or timing) may be adversely affected by the presence of the multiplicity of other components (i.e., the isolator, coupler, polarization-rotating splice) in the loop. Lastly, the presence of these additional elements in the loop increases the complexity of the design as well as the number of splices, and hence the total insertion loss.

Thus, a need remains in the art for simpler FP laser design that reduces insertion loss without the disadvantages attendant prior art FP designs.

SUMMARY OF THE INVENTION

These and other problems are addressed in a Fabry-Perot (FP) pulsed laser designed in accordance with my invention. The FP laser comprises a gain medium positioned between a pair of reflectors or mirrors which form a FP cavity or resonator and is characterized in that at least one of the reflectors comprises a waveguide loop coupled to the gain medium via an optical circulator. In one embodiment only a modulator is located in the loop in order to effect Q-switching or mode-locking. In an alternative embodiment these same functions are realized without a separate modulator by making the circulator itself switchable.

The overall design may be polarization independent or polarization dependent. In addition, an important feature of the invention is the inherent simplicity provided by the circulator-based loop reflector. The circulator itself is multi-functional; it isolates both sides of the modulator without the need for separate isolators in the loop to do so; it reduces to two the number of splices in the loop in a preferred embodiment of the invention, thereby reducing insertion loss and enhancing stability; and together with the loop it is essentially a 100% reflector. Finally, as discussed hereinafter, the circulator facilitates expansion of the laser to multi-port and multiplexed (multi-wavelength) operation.

BRIEF DESCRIPTION OF THE DRAWINGS

My invention, together with its various features and advantages, can be readily understood from the following more detailed description taken in conjunction with the accompanying drawing, in which:

In FIGS. 3–5 the pump sources (as well as their associated couplers) for the various gain media have been omitted for simplicity.

DETAILED DESCRIPTION OF THE INVENTION

Figure 1:
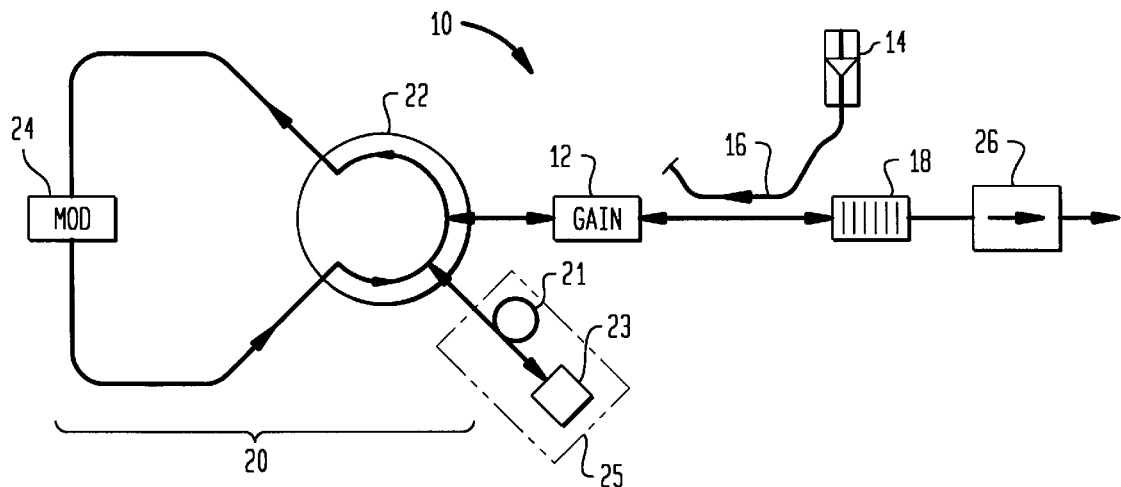
FIG. 1 is a schematic block diagram of a FP pulsed laser in accordance with one embodiment of my invention in which a circulator couples the waveguide loop to the gain medium.

With reference now to FIG. 1, a Fabry-Perot (FP) pulsed laser 10 comprises a gain medium 12 positioned on an optical axis between a pair of mirrors or reflectors 18 and 20. The laser 10 may operate, for example, as either a Q-switched or mode-locked laser. A source 14 of pump energy is coupled to the gain medium via a coupler or multiplexer 16. The pump source supplies electromagnetic energy at a wavelength and intensity sufficient for the medium 12 to provide optical gain. The interconnections between components, depicted as solid black lines, are optical waveguides; for example, optical fibers or substrate-supported integrated waveguides. Indeed, the gain medium itself may be a suitably doped optical fiber or solid state planar waveguide. As depicted, the output of the laser is taken through the reflector 18, which, therefore, is made to be partially transmissive. The output signal is coupled to a utilization device (not shown) through an isolator 26. The latter serves to prevented unwanted reflections from being coupled back into the laser and causing instability in the laser performance. As is well known in the art, however, the output signal can be taken from other locations in the laser structure.

In accordance with one embodiment of my invention, the reflector 20 comprises a waveguide loop coupled to the gain medium 12 via an optical circulator 22. The loop includes a suitable modulator 24 (e.g., an electro-optic modulator (EOM) or an acousto-optic modulator (AOM)) driven by a waveform (from a source not shown) suitable for Q-switching or mode-locking the laser. As depicted, the circulator is a multi-port device having one port coupled to the medium 12 and two other ports coupled to the loop.

In this embodiment, each quantum of laser light or radiation traverses the components making up the reflector 20 (e.g., the modulator 24) only once for every two passes through the gain medium. Consequently, the insertion loss of the laser 10 is reduced relative to that of conventional, pulsed FP laser designs. To appreciate better this advantage, consider the following illustration in which the numerical values of insertion loss are typical: interport loss of 1 dB for the circulator 22 and insertion loss of 4 dB for the modulator 24. In a conventional FP design each quantum of light makes two passes through the modulator for every two passes through the gain medium, therefore, the insertion loss from two passes through this component alone is 2×4 dB=8 dB. In contrast, in this embodiment of my invention each quantum of light passes through the modulator only once for every two passes through the gain medium plus two interport passes though the circulator 22; therefore, the insertion loss from these two components is 4 dB+2×1 dB=6 dB, a significant 2 dB advantage. Of course, if the modulator has a higher insertion loss (e.g., 5 dB would not be atypical) and/or the circulator has lower interport loss (e.g., 0.5 dB products are available), then the advantage would be even more attractive (e.g., 10 dB vs. 6 dB if the latter loss parameters are used in the calculation).

This embodiment of my invention has several additional features which render it attractive from a performance and simplicity standpoint. First, the reflector loop 20 is virtually the ultimate in simplicity—it requires only a modulator. No isolators are required to isolate the input and output of the modulator because that function is provided by the circulator. Second, only two splices are required (one on each side of the modulator), thus reducing insertion loss and enhancing stability (i.e., fewer splices means fewer sources of reflection which might render some kinds of modulators unstable).

Additional functionality may be provided by coupling an element 25 to a fourth port of circulator 22. For example, element 25 may be a compensator, a pulse compressor, or an ASE (amplified spontaneous emission) filter. As a compensator, element 25 comprises a mirror 23 (e.g., a Faraday rotator mirror) in series with a section 21 of optical waveguide or fiber, i.e., dispersion compensating fiber or conventional fiber functioning as a delay line to stabilize and maintain a desired cavity length. As a pulse compressor, element 25 comprises a chirped grating (not shown). And, as an ASE filter, element 25 comprises a grating/reflector (not shown) having a bandwidth (e.g., 1 nm) somewhat wider than that of reflector 18 (e.g., 0.1 nm), in order to extract ASE from the cavity, thereby increasing the power level at which saturation occurs and enabling higher power outputs.

Figure 2:
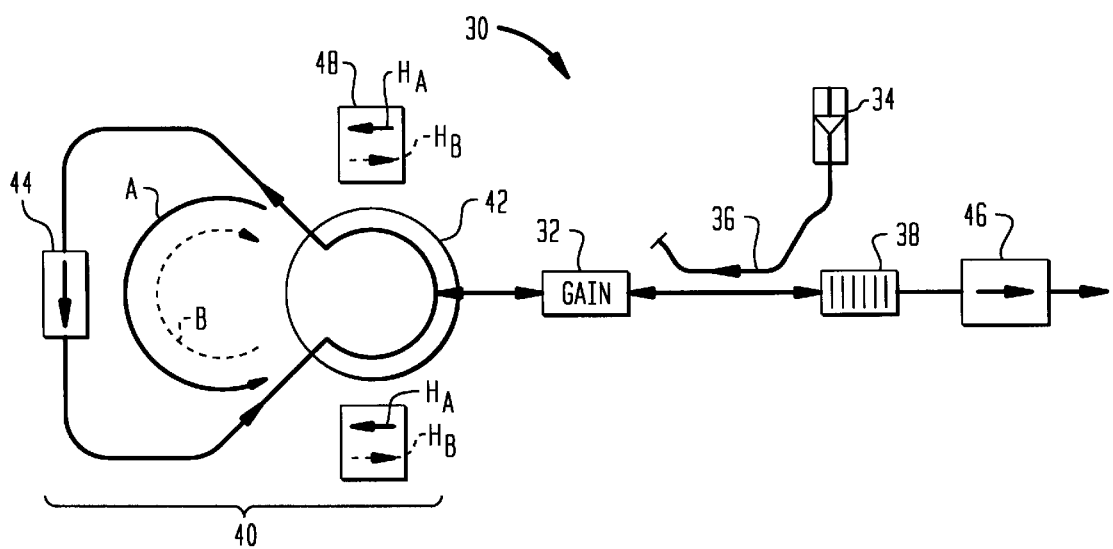
FIG. 2 is a schematic block diagram of a FP pulsed laser in accordance with another embodiment of my invention in which a switchable circulator couples the reflector loop to the gain medium.

In an alternative embodiment of my invention shown in FIG. 2, the loop reflector is modified to incorporate a switchable circulator and to obviate the need for a separate modulator. Thus, the loop reflector 40 comprises a circulator 42 and magnetic field controller 48 which is capable of setting the state of the circulator. Three states are possible: in state A the magnetic field $H_A$ causes light entering the circulator from the gain medium to exit via the top port and to traverse the loop in a counterclockwise direction indicated by the circular arrow A, in state B the magnetic field is reversed as shown by $H_B$ so that the light exits the circulator instead at the bottom port and traverses the loop in the clockwise direction as indicated by the circular arrow B; and in the third state C the magnetic field is turned off or reduced to a sufficiently low level so that essentially no light exits either port of the circulator and hence no light circulates in the loop.

Pulsed operation of the laser 30 is effected in one of two ways: (1) By incorporating a unidirectional device, such as an optical isolator 44, in the loop and operating the magnetic controller 48 so that the field repetitively switches between states A and B, the laser is turned off in state B because clockwise propagation (arrow B) is blocked by the isolator; whereas it is turned on in state A because counterclockwise propagation (arrow A) is allowed by isolator 44; (2) By operating the controller 48 so as to repetitively switch the circulator between state C and either state A or state B, the modulator can be omitted. In operation, the laser is turned off in state C since no light is coupled into the loop and hence no feedback is provided to the gain medium. In contrast, in either state A or state B the laser is turned on since the absence of the isolator permits either clockwise or counterclockwise propagation to occur, mission of the modulator means that insertion loss and lasing threshold are further reduced, thereby increasing the maximum output power available.

In the embodiment of FIG. 2 switching time may be limited by the speed at which the magnetic field can be reversed, making this design more appropriate for, although not necessarily limited to, Q-switching applications.

Implementation of my invention is possible utilizing many commercially available components which can be assembled to make a hybrid structure that incorporates both optical fiber components as well as other solid state components. However, the invention can also be constructed as an optical hybrid integrated circuit. Illustrative components include the following: (1) the gain media 12,32 may be optical fibers or a glass waveguides doped with Er or co-doped with Er and Yb to provide gain at infrared wavelengths well known in the art (2) the modulator 24 may bE an elecro-optic or acousto-optic modulator as mentioned previously, moreover it may be a phase-amplitude type, a traveling wave type, or a saturable absorption type; one or more of these are available from various sources including Lucent Technologies Inc., Breinigsville, Pa.; (3) the reflectors 18,38, which are well known in the art, may be fiber gratings of either the linear or chirped variety, although the latter may be advantageous in that they provide for pulse compression and higher peak pulse power, (4) the isolators 26,44,46 are also commercially available from Lucent, (5) the pump sources 14,34 may be semiconductor lasers or laser arrays which generate pump light at 980 nm or may be double clad fiber laser which generate pump light at 1060 nm, the choice depending on the gain medium utilized, semiconductor lasers of this type are available from Furakawa, Tokyo, Japan or from Lucent (6) the couplers/multiplexers 16,36 are commercially available from Gould, Millersville, Md., and (7) the circulator 22 is commercially available from JDS-Fitel, Nepean, Ontario, Canada, whereas the switchable circulator 48 is commercially available from FDK, Waltham, Mass.

EXAMPLE

This example describes a hybrid Q-switched FP laser which operated at a wavelength of 1536 nm and provided stable 200 ns optical pulses with 13.5 W of peak power at a repetition rate of 1 kHz. Pumping was provided by a GaAs/AlGaAs laser which delivered 180 mW of optical power at 980 nm to the gain medium of the laser. Various parameters, materials, dimensions, and operating conditions are specified by way of illustration only, and unless otherwise indicated are not intended to limit the scope of the invention.

The basic design of the Q-switched laser followed the configuration shown in FIG. 1. The gain medium 12 was a planar, glass, channel waveguide formed by ion-exchange and co-doped with Er and Yb. A Ti-indiffused $LiNbO_3$ EOM modulator 24 of the Mach-Zehnder type was utilized. The wavelength division multiplexer (WDM)16, which was employed to mix and split the 980 nm and 1536 nm wavelengths, had a 25 dB wavelength crosstalk and a 0.4 dB insertion loss at both wavelengths. The reflector 18 was a UV fiber Bragg grating having a reflectivity of 86.7% at the lasing wavelength of 1536 nm. The coupler, isolator and the circulator were all obtained from commercial sources. The optical insertion loss of the EOM was 5 dB, and the interport insertion loss of the circulator was 1 dB. The total cavity loss was only 7 dB compared to 10 dB for a conventional FP configuration. The Bragg grating linewidth was 0.6 nm full width at half maximum at 1536.4 nm, and its insertion loss was 0.2 dB at 1550 nm. The gain medium was a 43 mm long planar, glass, channel waveguide as described above. Characterization of this waveguide as an amplifier produced 10 dB of gain at 1536 nm for 75 mw of pump power. The pump threshold was 65 mw and the slope efficiency was 1%. The signal-to-noise ratio was greater than 40 dB for pump powers above 80 mW.

Q-switching operation of the laser was achieved by driving the EOM with a square wave (3 V peak-to-peak) and biasing it at 2.9 V to obtain an optical extinction ratio of 13 dB. The waveform had a 20% duty cycle, which corresponded to having the modulator introduce 30 dB of extra loss in the cavity during the off period (i.e., 80% of the cycle). The modulator's electrical bandwidth was 8 GHz at the 3dB power point. The resulting optical pulses had a pulse width of 200 ns and a peak power of 13.5 W at a repetition rate of 200 Hz.

MULTI-WAVELENGTH EMBODIMENTS

Figure 3:
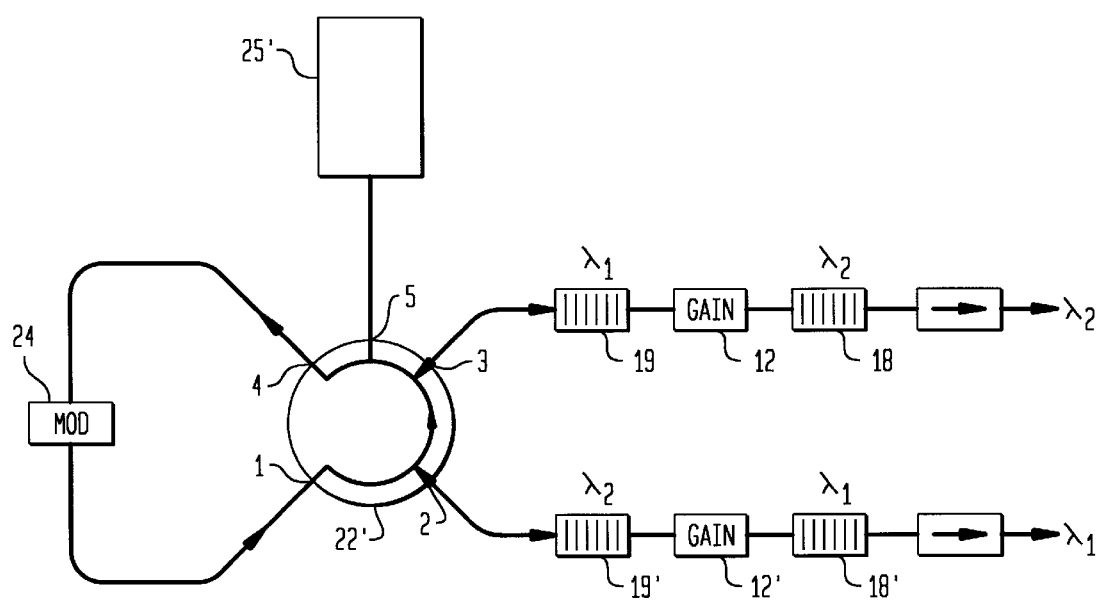
FIG. 3 is a schematic block diagram of an arrangement for operating two lasers at different wavelengths using a single modulator, in accordance with yet another embodiment of my invention.

The tandem operation of two lasers operating at different wavelengths $\lambda_1$ and $\lambda_2$ is depicted in FIG. 3. The arrangement utilizes a single modulator 24 in a waveguide loop, as in FIG. 1, to drive two laser arms. More specifically, a 4-port circulator 22' has ports 2 and 3 coupled to the separate laser arms and ports 1 and 4 coupled to the waveguide loop. The lower arm delivers a laser output at $\lambda_1$, whereas the upper arm delivers its output at $\lambda_2$. Each arm includes a gain medium 12,12' sandwiched between a pair of reflectors or filters 18, 19 and 18', 19', respectively. Reflectors 18 and 18' are partially transmissive at $\lambda_2$ and $\lambda_1$, respectively, in order to permit egress of their respective outputs. On the other hand, filters 19 and 19' are essentially 100% reflective at $\lambda_1$ and $\lambda_2$, respectively, but have wider bandwidths (e.g., 1 nm) than reflectors 18 and 18' (e.g., 0.1 nm). The function to prevent the $\lambda_1$ signal from entering the upper gain medium 12 and the $\lambda_2$ signal from entering the lower gain medium 12'.

In essence, therefore, the combination of the loop, modulator, circulator and reflector 19 functions as one resonator reflector for the laser in the lower arm (the other resonator reflector is reflector 18'), and the combination of the loop, modulator, circulator and the reflector 19'functions as one resonator reflector for the laser in upper arm (the other resonator reflector is reflector 18).

As with the embodiment of FIG. 1, the tandem laser arrangement of FIG. 3 may optionally include a compensation element 25' coupled to port 5 of the 5-port circulator 22'. In this case element 25' could readily be designed to provide compensation at the wavelengths of both lasers, or either of them.

Figure 5:
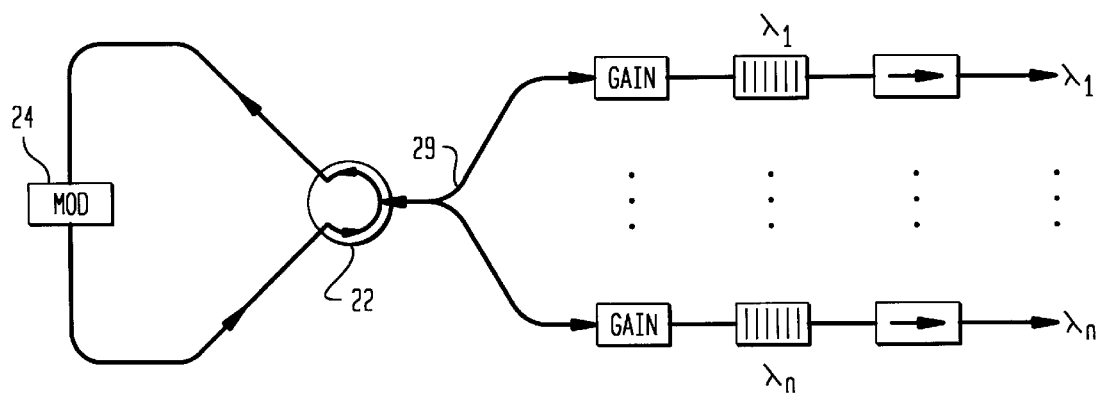
FIG. 5 is a schematic block diagram of a multiplexed arrangement for directing signals of different wavelengths onto separate paths (channels) and then amplifying them in separate gain media, in accordance with one more embodiment of my invention.

In a similar arrangement shown in FIG. 5, a wavelength division multiplexer 29, which replaces the 100% filters 19,19' of FIG. 3, distributes the signal onto a plurality of n separate paths or channels each of which constitutes as laser arm operating at a different wavelength $\lambda_i$(i=1,2 . . . n). But, as with FIG. 1, only a single modulator 24 drives all of the lasers.

Figure 4:
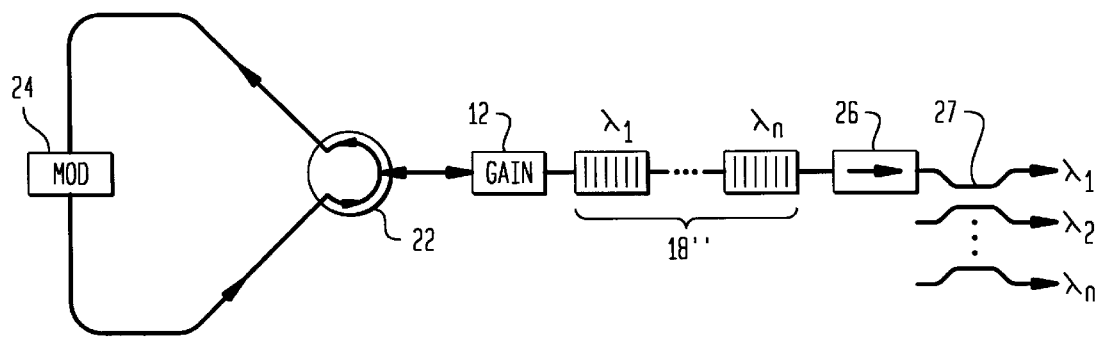
FIG. 4 is a schematic block diagram of a multiplexed arrangement for simultaneously amplifying signals of different wavelengths in a common gain medium and then separating them onto different paths (channels), in accordance with still another embodiment of my invention.

In contrast, in FIG. 4, a single laser arm is coupled to the circulator 22, but a tandem (i.e., series) arrangement of n reflectors or filters 18" are disposed between the gain medium 12 and the isolator 26. The filters have design wavelengths of $\lambda_i$(i=1,2 . . . n) so that all of the signals are simultaneously amplified in gain medium 12. After passing through the isolator 26, the signals are distributed onto separate paths or channels by means of WDM 27.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although not explicitly shown, it will be readily apparent to those skilled in the art how to implement my invention and its various embodiments in a hybrid integrated form.

What is claimed is:

1. A pulsed Fabry-Perot laser comprising
   a first optical channel including
      first and second reflectors forming a resonator, a first gain medium disposed in said resonator, a source of pump energy coupled to said gain medium to cause said medium to generate lasing radiation, said first reflector comprising a waveguide loop, a modulator disposed in said loop, and a coupler for coupling said loop to said gain medium, characterized in that:

said coupler comprises a circulator having a plurality of ports, one port being coupled to said gain medium and two ports being coupled to said waveguide loop.

2. The invention of claim 1 wherein said modulator is the only component in said loop.

3. The invention of claim 1 further including an element coupled to a fourth port of said circulator, said providing a function which includes compensation, pulse compression, or ASE filtering.

4. The invention of claim 1 wherein said circulator is switchable between two states characterized by opposite directions of propagation of said radiation in said loop and said modulator comprises a unidirectional device, and further including a controller for repetitively switching said circulator between said states.

5. The invention of claim 4 wherein said unidirectional device comprises an optical isolator.

6. The invention of claim 1 wherein said first optical channel generates a laser output at a first wavelength and further including a second optical channel for generating a laser output at a second wavelength, said second channel being coupled to a fourth port of said circulator and comprising a second gain medium and a third reflector forming a second resonator with said first reflector, said first reflector including fourth and fifth reflectors having essentially 100% reflectivity at said first and second wavelengths, respectively, and having wider bandwidths than said second and third reflectors, said fourth reflector being disposed between said circulator and said second gain medium, and said fifth reflector being disposed between said circulator and said first gain medium.

7. The invention of claim 1 wherein said second reflector comprises a plurality of reflectors arranged in series with one another, each of said reflectors having a different design wavelength and further including a multiplexer coupled to said reflectors to distribute different wavelength signals onto different optical paths.

8. The invention of claim 1 further including a plurality of said channels each operating at a different wavelength and a multiplexer coupling said circulator to said channels.

9. A Fabry-Perot pulsed laser comprising first and second reflectors forming a resonator, a gain medium disposed within resonator, a source of pumping energy coupled to said gain medium to generate lasing radiation, said first reflector comprising a waveguide loop and coupler for coupling said loop to said gain medium, characterized in that said coupler comprises a switchable circulator having a plurality of ports and being switchable between two states, in one of said states said radiation propagates in said loop and in the other it does not, said loop comprises an optical waveguide coupling two of said ports directly to one another and having no components interrupting said loop, and a controller switches said circulator between states.

* * * * *